(12) United States Patent
Jin

(10) Patent No.: US 6,867,820 B2
(45) Date of Patent: Mar. 15, 2005

(54) METHOD FOR DISPLAYING AUDIO SETTINGS MENU OF DISPLAY APPARATUS

(75) Inventor: Sang Un Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 09/800,739

(22) Filed: Mar. 8, 2001

(65) Prior Publication Data

US 2001/0029616 A1 Oct. 11, 2001

(30) Foreign Application Priority Data

Mar. 8, 2000 (KR) .......................................... 2000/11517

(51) Int. Cl.[7] ................................................. H04N 5/60
(52) U.S. Cl. ........................ 348/738; 348/705; 381/306
(58) Field of Search ................................ 348/738, 553, 348/706, 705, 552; 381/103, 300, 306, 303, 58, 59; 702/122; 700/11, 17; 710/15–18, 72, 73

(56) References Cited

U.S. PATENT DOCUMENTS

| | | | | |
|---|---|---|---|---|
| 4,589,134 A | * | 5/1986 | Waldron ...................... 381/90 |
| 4,626,892 A | * | 12/1986 | Nortrup et al. ............ 358/27 R |
| 5,042,070 A | * | 8/1991 | Linna et al. ................... 381/59 |
| 5,541,638 A | * | 7/1996 | Story ............................. 348/7 |
| 5,581,621 A | * | 12/1996 | Koyama et al. ............ 381/103 |
| 5,631,850 A | * | 5/1997 | Tanaka et al. .............. 702/122 |
| 5,775,939 A | * | 7/1998 | Brown ........................ 439/502 |
| 6,100,936 A | * | 8/2000 | Jordan et al. ............... 348/552 |
| 6,195,438 B1 | * | 2/2001 | Yumoto et al. ............. 381/103 |

* cited by examiner

Primary Examiner—Victor R. Kostak
(74) Attorney, Agent, or Firm—Birch, Stewart, Kolasch & Birch, LLP

(57) ABSTRACT

The present invention relates to a multi-channel audio menu display method and an apparatus thereof. The audio menu display method in accordance with the present invention comprises detecting the connection state of audio output terminals, receiving audio source information from the audio source content received from the DTV, determining a usable audio menu for displaying on a certain screen in accordance with the connection state and audio source information, and displaying the determined usable audio menu on the screen. Accordingly the present invention is capable of displaying only the present usable menu to a user, preventing the user from setting the menu wrongfully, and allowing the audio menu selection more conveniently.

12 Claims, 5 Drawing Sheets

CONNECTION STATE

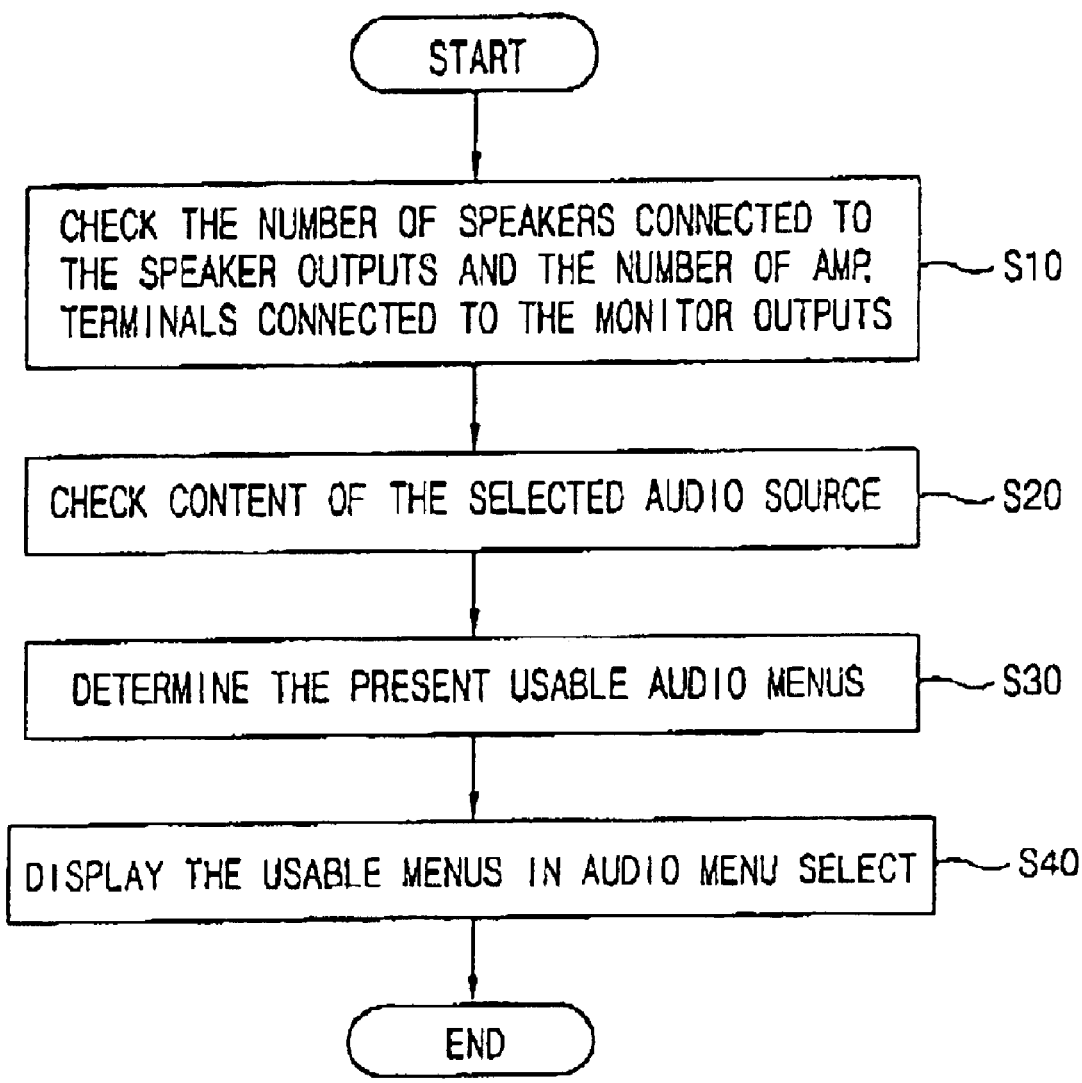

METHOD FOR DISPLAYING AUDIO SETTINGS MENU OF DISPLAY APPARATUS

BACKGROUND OF THE INVENTION

1. Field of the Invention

The present invention relates to an audio menu display method, in particular to a method for displaying and selecting a multi-channel audio menu and an apparatus thereof.

2. Description of the Prior Art

Among various display apparatus, there is an ATSC (advanced Television System Committee), a NTSC (National Television Standard Committee), a satellite broadcast, a SPDIF (Sony Philips Digital Interface), and an analog left/right input as an audio source inputtable to a digital television (DTV). There is a speaker output and a monitor output as an analog output from the DTV to an external device.

Herein, the speaker output is connected to an outer speaker in order to output a signal amplified in the DTV, and the monitor output is connected to a power amplifier installed outside of the DTV for better sound quality.

In general, a television has a speaker output, and a DVD (digital Versatile Disc) or a set-top box has only a monitor output.

FIG. 1 is a block diagram illustrating audio sources inputtable to a DTV, a speaker output, and a monitor output.

A DTV 5 receives signals from the inputtable sources such as a satellite broadcast source 1, a terrestrial broadcast source 2, a SPDIF (Sony Philips Digital Interface) digital signal source 3, an analog left/right source 4, and outputs an audio signal by processing the input signals through a built-in speaker 5-1, a speaker output terminal 5-2, and a monitor output terminal 5-3. Herein, the speaker output terminal 5-2 outputs an audio signal through a speaker 6, and the monitor output terminal outputs an audio signal. An external amplifier 7 amplifies the monitor output and transfers it to the speaker 6.

Below Table 1 describes the inputtable sources and the number of channels of each source.

TABLE 1

| Source | Kind of audio | The number of channel |
| --- | --- | --- |
| Terrestrial ATSC | AC-3 | 1~5.1 |
| Terrestrial NTSC | Analog L/R | 2 |
| Satellite broadcast | AC-3 | 2~5.1 |
|  | MPEG | 2 |
| SPDIF digital input | AC-3 | 1~5.1 |
|  | MPEG | 2 |
|  | PCM | 2 |
| Analog L/R input | Analog L/R | 2 |

Herein, a user can listen to audio through an internal speaker of the DTV, however, the performance of the internal speaker of the DTV is not as good as the performance of the outer (external) speaker. Although, three internal speakers can generally be installed on the left, right, and center of the DTV, a user who wants to listen to better sound or a viewer who wants to enjoy a surround or a subwoofer has to connect the outer speaker to the speaker output terminal of the DTV or has to connect the outer power amplifier to the monitor output terminal of the television.

Meanwhile, when 5.1 channels are embodied on the DTV, because the sources of the DTV and channels of the sources are various, there can be lots of user selectable menus. The audio menu displayed on the analog television is no match for that. For example, when the 5.1 channels are embodied, user selectable menus can be described as below.

EXAMPLE 1

Listening Mode

The selectable menus in accordance with the number of the outer speakers connected to the speaker output terminals of the DTV and the number of the terminals of the outer amplifiers connected to the monitor outputs can be described as below in Table 2.

TABLE 2

| Listening Mode | |
| --- | --- |
| Dolby digital | Left/center/left surround/right surround/subwoofer |
| Dolby prologic | Left/right/center/mono surround |
| Phantom center | Left/right/left surround/right/surround/subwoofer |
| 3 stereo | Left/right/center |
| Stereo | Left/right |
| Mono | |

EXAMPLE 2

Balance Control

In order to balance outputs of left/right and left surround/right surround audio signals, a balance control is performed as below.

TABLE 3

| Balance Control |
| --- |
| Left-Right Balance |
| Left Surround-Right Surround Balance |

EXAMPLE 3

Channel Delay

For optimum listening circumstances, as depicted in Table 4, an output delay of an audio channel is adjusted so as to transmit the sound of front channels (L/R/C) and the sound of back channels (Left surround/Right surround) to the viewer at the same time.

TABLE 4

| Channel Delay |
| --- |
| Surrourd time Delay |
| Center time Delay |

EXAMPLE 4

Volume Control

It can be described as below.

TABLE 5

| Volume Control | |
| --- | --- |
| Master Volume Control | Volume Control about all channels |
| Volume Control about each channel | |

TABLE 5-continued

Volume Control

| Test Mode | Listen a set volume of the each channel |

EXAMPLE 5

Output Construction

A construction 1 and 2 described in Table 6 are for Dolby certification. According to "Licensing Information Manual" of Dolby Lab., 5.1ch DTV should have this configuration. Herein, a name of the menu can be determined appropriately.

TABLE 6

Output Configuration

| Construction 1 | Separate low-pass elements from the L/R/C/Ls/Rs channels and transmit them to the subwoofer |
| Construction 2 | Separate low-pass elements from the C/Ls/Rs channels and transmit them to the subwoofer |
| Construction 3 | Option item |

EXAMPLE 6

Additional Audio Service Functions

A digital audio signal is decoded in accordance with regulated compression standards such as an AC (audio Coding)-3 or a MPEG (Moving Picture Expert Group) etc., and is transmitted. It is possible to perform below audio services in the AC-3/ MPEG.

VI: Visually Impaired

HI: Hearing Impaired

ME: Music and Effects, used with Dialogue

Dialogue: used with ME, and used for a multilingual service

C: Commentary, comments about a program

E: Emergency, inform an emergency

VO: Voice Over, Overlap audio with existing broadcast audio

EXAMPLE 7

Additional Menus

Multilingual audio selection menu similar stereo: Make stereo with Mono source

Front Surround: Make surround effect with a left and a right speakers

Dynamic Range Compression On/Off: Reproduce dynamic range of AC-3 or reproduce the dynamic range of AC-3 as it is Prologic On/Off: When an AC-3/MPEG source encoded with Dolby prologic or 2 channel analog signal and a digital PCM signal are inputted from outside, determine automatically whether a prologic processing is performed or not As described in Examples 1–7, lots of audio menus can exist when the DTV is embodied with 5.1 channels in accordance with the conventional technology. However, the number of actual usable menus are strictly limited in accordance with the number of outer speakers connected to the speaker output terminals of the DTV or the number of outer amplifier terminals connected to the monitor output terminals, the present audio input selected among a plurality of audio inputs, and in case of the AC-3, the number of channels and the kind of services.

Accordingly, these audio menus can cause confusion and inconvenience to the user, and the user can not listen to the audio properly when the wrong menu is selected.

SUMMARY OF THE INVENTION

An object of the present invention is to provide an audio menu display method and an apparatus thereof which are capable of displaying only usable audio menus by being connected to a DTV.

In order to achieve the above-mentioned and other objects, the audio menu display method of the DTV in accordance with the present invention comprises detecting a connection state of audio output terminals, getting audio source information from audio source content received from the DTV, determining a usable audio menu for displaying on a certain screen in accordance with the connection state and audio source information, and displaying the determined usable audio menu on the screen.

The audio menu display apparatus of a digital television in accordance with the present invention comprises a display for displaying video, and a CPU for displaying an audio menu on the display.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is a flow chart illustrating an audio menu display method in accordance with the present invention.

DETAILED DESCRIPTION OF THE PREFERRED EMBODIMENTS

The present invention relates to an audio display method and an apparatus thereof which are capable of displaying only user usable audio menus among a plurality of audio menus. The user usable menus can be determined by considering the number of outer speakers connected to speaker output terminals of a TV or the number of outer amplifier channels (or terminals) connected to monitor output terminals, and the present selection of audio input among a plurality of audio inputs. For example, the usable audio menus are determined by considering the number of channels, and the kind of services in an AC-3/MPEG.

First, a method for determining the actual usable audio menu will now be described.

The number of the outer speakers connected to the speaker output terminals of the DTV or the number of the outer amplifier terminals connected to the monitor output terminals are determined. Herein, terminals capable of knowing a connection state of the terminals are used for the speaker output terminals and monitor output terminals. For example, when the terminal is in the connection state, high voltage is outputted. When the terminal is not in the connection state, a low voltage is outputted. Accordingly, when the output voltages are inputted to a CPU (not shown) in a DTV, the CPU can know the present connection state of the speaker output terminal or monitor output terminal.

Figure 2A:
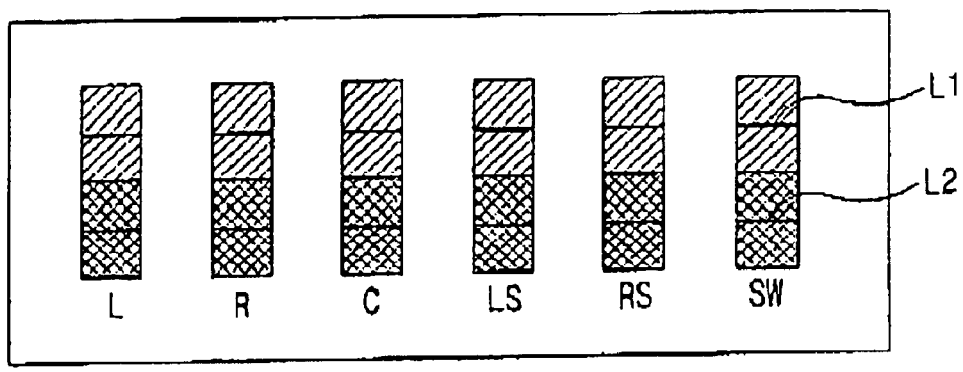
FIG. 2A is a block diagram illustrating speaker output terminals in accordance with the present invention.

FIG. 2A is a block diagram illustrating speaker output terminals in accordance with the present invention, the output terminals having a clip form which can be used. Herein, L1 and L2 are holes for connecting each signal line.

Figure 2B:
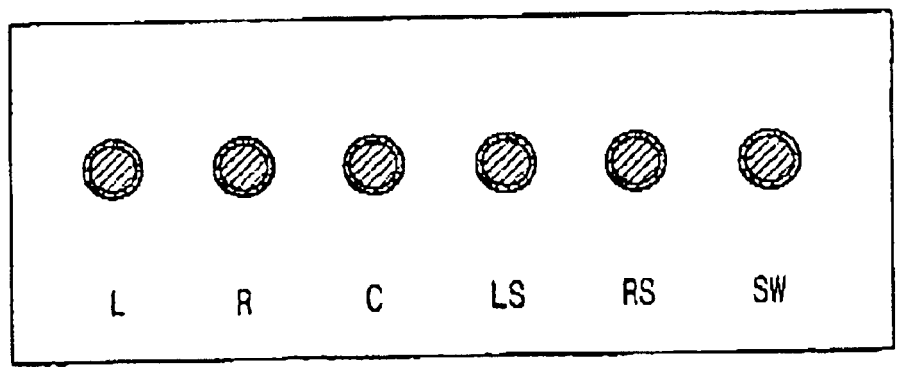
FIG. 2B is a block diagram illustrating monitor output terminals in accordance with the present invention.

FIG. 2B is a block diagram illustrating monitor output terminals in accordance with the present invention. As shown, RCA terminals can be used.

Figure 3A:
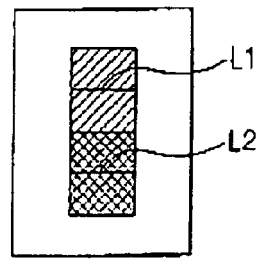
FIGS. 3A–3D illustrate examples of the monitor output terminal in accordance with the present invention.
Figure 3B:
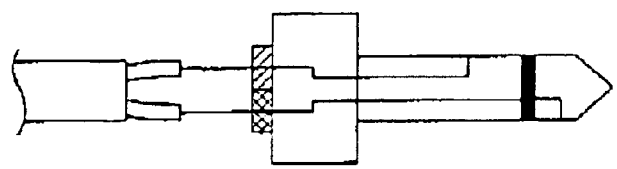

FIG. 3A is a front view of a male connector of a speaker output terminal in accordance with the present invention, and FIG. 3B is a side view of the side connector of the speaker output terminal.

Figure 3C:
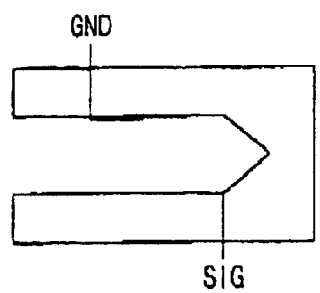
Figure 3D:
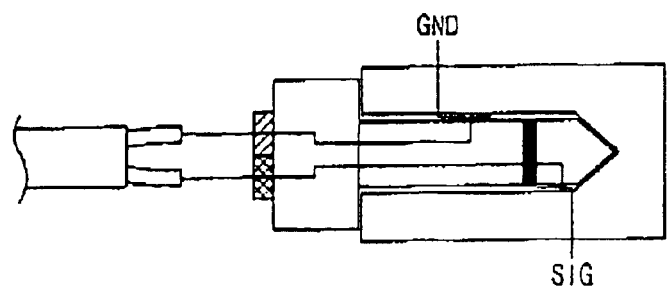

FIG. 3C is a side view illustrating a female connector of the speaker output terminal in accordance with the present invention, and FIG. 3D is a side view illustrating a connection state of the male connector and female connector. It is designed to recognize the ON/OFF state of the speaker output terminal automatically and mechanically.

FIG. 4 is a flow chart illustrating an audio menu display method in accordance with the present invention. An audio menu is displayed by detecting the connection state of the present speaker output terminal or monitor output terminal by a CPU.

First, the CPU (e.g., in the DTV) detects the connection state of the speaker output terminal or monitor output terminal of the DTV. For example, the number of the speakers connected to the DTV or the number of the outer amplifier terminals connected to the monitor output terminals is detected S10. Then, audio source information selected by the user and audio source content information received to the DTV is obtained S20.

When the user changes the audio input source, for example, the user changes a channel, the detecting process of step S20 is performed, as described above, because the audio source, namely, the program is changed. The detecting process of step S20 is performed whenever the audio source is changed.

Herein, the content of the audio source can be detected by referencing program information or content of an audio stream in case of the ATSC or satellite broadcast. In addition, in case of digital audio input as the SPDIF (Sony Philips Digital Interface), the content of the audio source can be detected by referencing the content of the audio stream.

Accordingly, the present method detects the number of the speakers connected to the TV speaker output terminals or number of the outer amplifier terminals connected to the monitor output terminals, and the present selection of audio input and content of the audio source, determines the present usable audio menus S30, and displays only the determined usable menus on the screen S40 when the user selects an audio menu.

Figure 5:
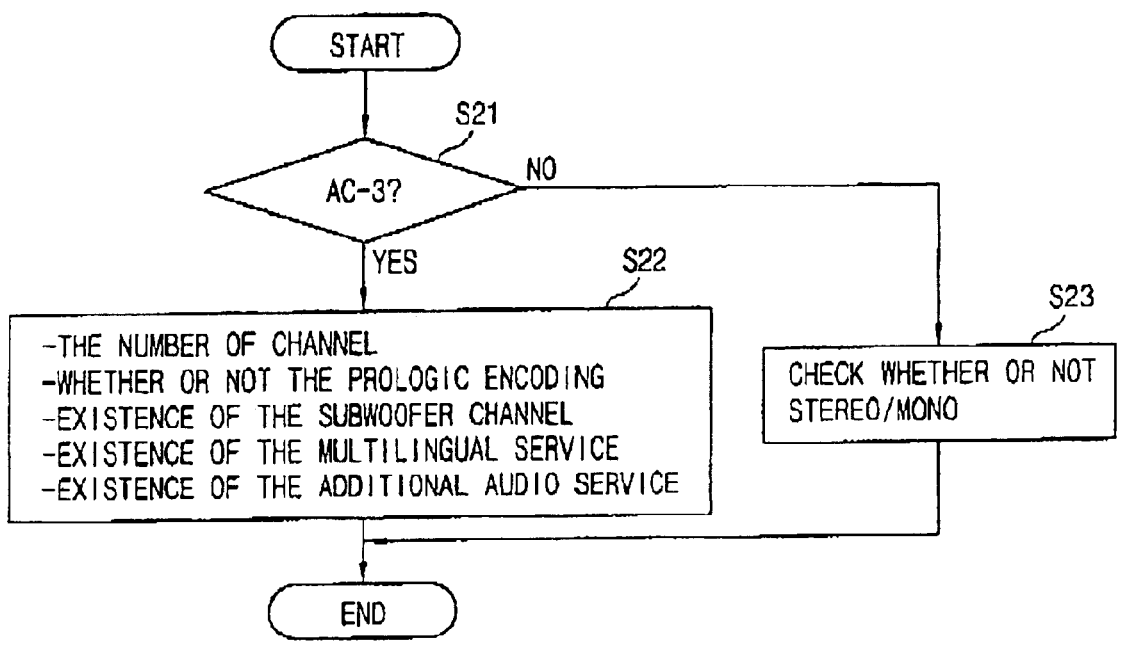
FIG. 5 is a flow chart illustrating a method for getting information of an audio source in accordance with the present invention.

FIG. 5 is a flow chart illustrating a method for getting information of an audio source in accordance with the present invention.

For example, when the selected audio source is encoded with the AC-3 S21, the CPU can get the audio source information for example by checking the number of channels, whether or not the prologic encoding in present, the existence of the subwoofer channel, the existence of the multilingual service, existence of the additional audio service, etc. at S22. On the contrary, when the selected audio source is not encoded with the AC-3, the CPU can get the audio source information by checking whether or not the system is in stereo/mono state S23.

Figure 1:
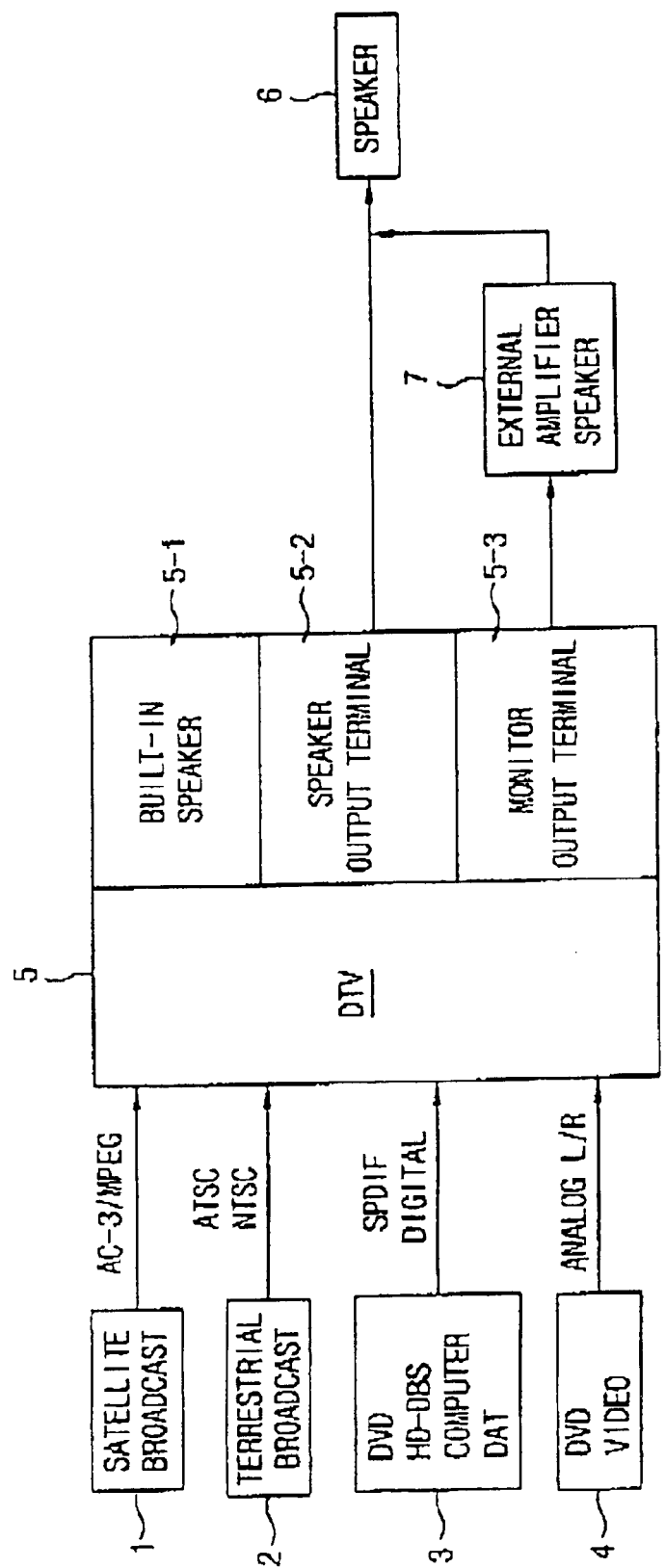
FIG. 1 is a block diagram illustrating audio sources inputtable to a DTV, a speaker output, and a monitor output.

The methods of FIGS. 4 and 5 can be implemented using existing hardware such as one shown in FIG. 1, if it is electronically configured to implement the present methods.

The displayed audio menu will now be described in more detail in accordance with the audio source information.

For example, if the audio source is a terrestrial ATSC, the kind of the audio is the AC-3 encoding, and the number of the channels is 5.1. In addition, three outer speakers are connected to a left L, a right R, and a center C of the actual speaker output terminals, and two outer amplifier terminals are connected to a left L and a right R of the monitor output terminals.

EXAMPLE 1

Listening Mode

Because the number of the outer speakers connected to the speaker output terminals of the DTV is three (L, R, C) and the number of the outer amplifiers connected to the monitor outputs is two (L, R), as depicted in Table 7, the user selectable menu can be described as below Table 7.

TABLE 7

| Listening Mode | |
| --- | --- |
| 3 Stereo | Left/Right/Center |
| Stereo | Left/Right |
| Mono | |

EXAMPLE 2

Balance Control

Because the surround is not connected, the balance control can be described as below Table 8.

TABLE 8

| Balance Control |
| --- |
| Left-Right Balance |

EXAMPLE 3

Channel Delay

In order to allow the viewer to listen to the sound in the optimum listening circumstances, the output delay of an audio signal is adjusted so as to transmit the sound of the front channels L/R/C and the sound of the back channels (Left Surround/Right Surround) to the viewer at the same time. Herein, the Surround is not connected, and accordingly it is not displayed.

EXAMPLE 4

Volume Control

It is displayed about the L, R, C channels, which can be described as below Table 9.

TABLE 9

| Volume Control | |
|---|---|
| Master Volume Control | Volume Control about the L, R, C channels |
| Volume Control about the L, R, C channels | |
| Test Mode | Listen a set volume of the each L, R, C channel |

EXAMPLE 5

Output Construction

Because there is no subwoofer, it is not displayed.

EXAMPLE 6

Additional Audio Service Functions

Below additional audio services are possible in the AC-3/MPEG.

VI: Visually Impaired
HI: Hearing Impaired
ME: Music and Effects, used with Dialogue
Dialogue: used with ME, and used for a multilingual service
C: Commentary, comments about a program
E: Emergency, inform an emergency
VO: Voice Over, Overlap audio with existing broadcast audio

EXAMPLE 7

Additional Menus

Multilingual select menu
similar stereo: Make stereo with Mono source
Front Surround: Make surround effect with a left and a right speakers
Dynamic Range Compression On/Off: Reproduce dynamic range of AC-3 after reducing it or reproduce the dynamic range of AC-3 as it is Accordingly, the displayed audio menus are strictly limited in accordance with the number of outer speakers connected to the speaker output terminal of the TV or the number of the outer amplifier terminals connected to the monitor output terminal, the present audio input selected among a plurality of audio inputs, and in the AC-3, the number of channels and kind of services.

The present invention can be adapted to audio menus of a set-top box, an A/V amplifier, an A/V receiver as well as the DTV.

The above-described audio menu display method and an apparatus thereof in accordance with present invention are capable of preventing the user from setting audio menus wrongfully, and selecting the audio menu conveniently by displaying only the present usable audio menus to the user. Particularly, when the 5.1 channels are embodied, because the present invention arranges many and complicated audio menus and displays only the present usable menus to the user, it is possible to provide convenience to the user in the audio menu selection process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for displaying audio settings menu of a display apparatus, comprising:

detecting a connection state of audio output terminals, wherein the audio output terminals are speaker output terminals and monitor output terminals, and wherein the connection state is the number of speakers connected to the speaker output terminals and the number of external amplifiers connected to the monitor output terminals, and wherein the detecting step further comprises detecting an audio input by a user and the content of the audio source;

receiving audio source information from audio source content received from the display apparatus;

determining usable audio menus based on the connection state and the audio source content information; and displaying only the determined usable audio menus on a screen of the display apparatus.

2. The method according to claim 1, wherein the audio input is varied in accordance with channel alternation of the user.

3. The method according to claim 1, wherein the content of the audio source is a broadcast program.

4. The method according to claim 1, wherein the audio source is a satellite broadcast, a terrestrial broadcast, a digital signal, or an analog signal.

5. The method according to claim 4, wherein the audio source information is obtained by referencing program information or content of an audio stream in an ATSC or the satellite broadcast, and the digital signal is received by referencing the content of a digital signal stream.

6. The method according to claim 1, wherein the determining step further comprises a detecting process for detecting whether or not an audio state of the display apparatus is stereo/mono when the audio source is not encoded with an AC-3.

7. The method according to claim 1, wherein the determining step is performed each time a user alters a channel during audition or a program is changed.

8. The method according to claim 1, wherein the determining step is performed whenever a user changes an audio input.

9. The method according to claim 1, wherein the determining step checks a number of channels and a kind of services present when the audio source is an AC-3/MPEG.

10. The method according to claim 1, wherein in the receiving step, the display apparatus is a digital television.

11. A method for displaying audio settings menu of a display apparatus, comprising:

detecting a connection state of audio output terminals;

receiving audio source information from audio source content received from the display apparatus;

determining usable audio menus based on the connection state and the audio source information, wherein the determining step further comprises a detecting process for detecting the number of channels, whether or not a prologic encoding exists, an existence of a subwoofer channel, an existence of a multilingual service, and an existence of additional audio services, when the audio source is encoded with an AC-3; and displaying only the determined usable audio menus on a screen of the display apparatus.

12. An apparatus for displaying audio menu of a DTV (digital television) having audio output terminals for outputting an audio signal to an external speaker through the external speaker or an external amplifier and a CPU for displaying an audio menu on the display, the apparatus comprising:

means for detecting audio source content information;

means for detecting a connection state of the audio output terminals, wherein the audio output terminals are speaker output terminals and monitor output terminals, and wherein the connection state is the number of speakers connected to the speaker output terminals and the number of external amplifiers connected to the monitor output terminals; and means for determining usable audio settings menus based on the connection state and audio source content information, the audio source information being received from audio source content received from the DTV, wherein only the determined usable audio settings menus are displayed on the display of the DTV.

* * * * *